Dec. 11, 1962     T. B. CORREY     3,068,352
METHOD FOR OBTAINING AN IMPROVED WELD IN INERT ARC WELDING
Filed April 20, 1961
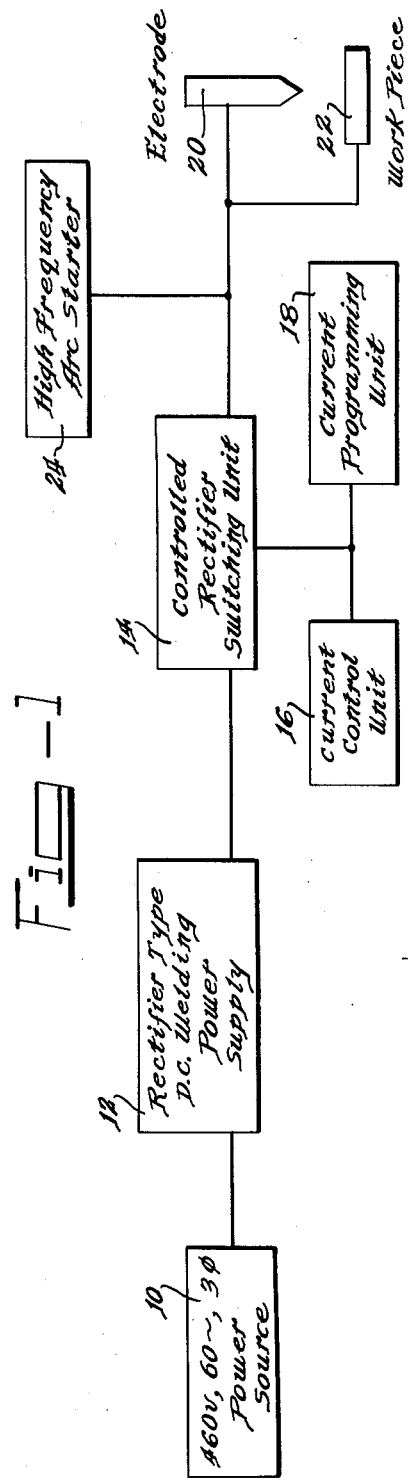
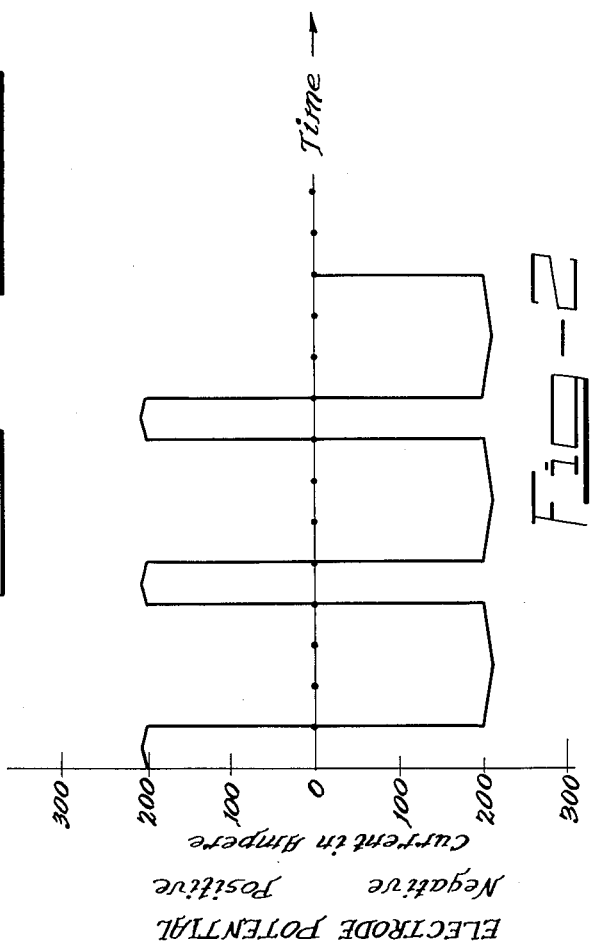
INVENTOR.
*Thomas B. Correy*
BY
*Roland A. Anderson*
*Attorney*

3,068,352
METHOD FOR OBTAINING AN IMPROVED WELD IN INERT ARC WELDING
Thomas B. Correy, Richland, Wash., assignor to the United States of America as represented by the United States Atomic Energy Commission
Filed Apr. 20, 1961, Ser. No. 104,488
5 Claims. (Cl. 219—137)

This invention relates to arc welding and more specifically to a method for obtaining an improved weld in the inert arc welding of aluminum and similar metals.

In the general inert arc welding of aluminum and similar metals, a balanced A.-C. sine-wave welding current is applied to the electrode and workpiece. In the inert welding arc using sine-wave alternating current, there is rectification caused by the temperature difference and the electron characteristics of the electrode and the workpiece. With the greatest amount of rectification experienced in welding aluminum, which produces on the order of 10 percent of the heat when the workpiece is negative, there is still adequate positive ion energy bombarding the workpiece to produce the required cleaning. However, the differential temperature that occurs in the weld is too great to produce complete alloying when two or more alloys are being fused into a homogeneous weld alloy. Further, in the portion of the welding current cycle when the workpiece is negative and the electrode positive, the arc is shaped like a right circular cone with the base thereof in contact with the workpiece. Thus, when the cleaning of the oxide coating from the workpiece has been accomplished in this condition, the remaining energy in this portion of the welding current cycle is devoted to melting the base metal, and since the energy density of the arc is low at the surface of the workpiece, a poor depth to width ratio weld results. This is further compounded since virtually twice as much heat is generated at the positive end of an electric arc as at the negative end.

It is therefore one object of this invention to provide a method for obtaining an improved weld in A.-C. inert arc welding.

It is another object of this invention to provide a method for improving alloying in a weld in A.-C. inert arc welding.

It is another object of this invention to provide a method for obtaining a smooth surface weld in A.-C. inert arc welding.

It is still another object of this invention to provide an improved depth to width ratio in a weld in A.-C. inert arc welding.

The present invention broadly comprises a method for improving a weld when using A.-C. inert arc welding by using a square-wave A.-C. current wherein the energy contained in the positive portion of each cycle thereof with the electrode positive is substantially less than the energy in the negative portion of each cycle thereof with the electrode negative. More specifically the method comprises applying to the workpiece and electrode a square-wave A.-C. current wherein the positive portion of each cycle thereof with the electrode positive is substantially equal in amplitude and substantially shorter in time duration than the negative portion of each cycle thereof with the electrode negative.

In the drawings:

FIG. 1 is a block diagram of an apparatus for the present invention, and

FIG. 2 is a representative current waveform produced by the apparatus of FIG. 1.

Referring now to FIG. 1, a power source 10 delivers 460 volt, 3 phase, 60 cycle power to a rectifier type D.C. welding power supply 12. The D.-C. welding power supply 12 subjects the current to full-wave rectification and reduces it in value so that the output therefrom is a continuous D.-C. current having a ripple of not more than 2 percent. The D.-C. current is then fed to a controlled rectifier switching circuit 14 where it is operated upon by a current control unit 16 and a current programming unit 18 to give an output waveform similar to that shown in FIG. 2. The time required for switching from the positive to the negative portion of a cycle is from 4 to 20 microseconds so that there is an almost negligible effect on the current waveform. The current programming unit 18 controls the total amount of energy delivered to the electrode 20 and the workpiece 22 i.e. X amperes for Y seconds. The current control unit 16 controls the time duration of the positive and negative portions of a cycle. In operation, a standard high frequency arc starter 24 initiates the arc between the workpiece 22 and the electrode 20 and then the programmed current having a waveform similar to that shown in FIG. 2 is applied thereto.

In FIG. 2, the waveform shown is considered the minimum desirable waveshape to produce the desired objects of this invention wherein the amplitude of the current is substantially constant and the time of the positive and negative portions of the cycles therein are varied. By minimum desirable waveshape, applicant means that the positive portion of a cycle shall exist for not more than 25 percent of the duration of the cycle and the shape of the current shall be essentially a square wave. It is apparent that under such conditions, not more than about 25 percent of the total energy is expended during the positive portion of the cycle. When the cycle goes positive, which may be called condition 1, the workpiece 22 is negative and the electrode 20 positive. In this condition 1, the thermal-barrier oxide coating existing on the surface of the workpiece 22 is blasted therefrom and the base metal exposed for melting. In accordance with the invention, condition 1 is therefore limited so that the positive portion of the current waveform has an amplitude and time duration sufficient only to perform this function. When the cycle goes negative, which may be called condition 2, the workpiece 22 becomes positive and the electrode 20 negative. In condition 2, the right circular cone shape of the arc of condition 1 changes and the area of the arc in contact with the workpiece 22 becomes less, thus giving rise to a greater energy density at the point of weld. Since the workpiece 22 is positive in condition 2, the heat generated by the arc thereon is twice that in condition 1 and since the energy density is higher, a weld will result having a greater depth to width ratio than in the conventional method. Further, since the arc will have essentially the characteristics of a direct-current arc wherein the temperature differential with respect to time is constant, improved alloying in the weld will result.

It is to be understood that the waveshape shown in FIG. 2 is merely representative and that for different materials different waveshapes having varying amplitudes and varying time durations will be applicable. For instance, in the welding of 30 mil aluminum the welding current should have a value of about 100 amperes at 14 volts with the positive portion (condition 1) existing approximately 10 percent of the duration of each cycle and the negative portion (condition 2) existing approximately 90 percent of the duration of each cycle.

Further, from the foregoing analysis it is readily obvious that the respective time durations of the negative and positive portions of each cycle may be held equal in time duration and the amplitude of the current varied so that only sufficient energy is present in the positive portion of the cycle to give surface cleaning of the workpiece 24 and the negative cycle contains the energy necessary to achieve the weld. It is also obvious that combinations of unequal time durations and unequal amplitudes of the positive and negative portions of the current waveform cycles may be used to achieve the desired energy distribution between the portions.

Persons skilled in the art will, of course, readily adapt the general teachings of the invention to methods far different than the method illustrated. Accordingly, the scope of protection afforded the invention should not be limited to the particular methods thereof shown in the drawings and described above, but shall be determined only in accordance with the appended claims.

What is claimed is:

1. A method of inert arc welding comprising the step of applying to the workpiece and welding electrode an A.-C. welding current wherein the positive portion of each cycle thereof with the electrode positive has only sufficient energy therein to clean the surface of the workpiece and the negative portion of each cycle thereof with the electrode negative contains the energy required to weld.

2. A method of inert arc welding comprising the step of applying to the workpiece and welding electrode an A.-C. welding current wherein the positive portion of each cycle thereof with the electrode positive contains no more than 25 percent of the energy contained in each cycle.

3. A method of inert arc welding comprising the step of applying to the workpiece and welding electrode an A.-C. welding current wherein the positive portion of each cycle thereof with the electrode positive is equal in time duration and substantially less in amplitude than the negative portion of each cycle thereof with the electrode negative.

4. A method of inert arc welding comprising the step of applying to the workpiece and welding electrode a square-wave A.-C. welding current wherein the positive portion of each cycle thereof with the electrode positive is substantially equal in amplitude to the negative portion of each cycle thereof with the electrode negative and the positive portion of each cycle has a time duration not more than 25 percent of the time duration of each cycle.

5. A method of inert arc welding 20 mil aluminum comprising the step of applying to the workpiece and welding electrode a square-wave A.-C. welding current wherein the positive and negative portions of each cycle thereof each have an amplitude of about 100 amperes and the positive portion of each cycle with the electrode positive has a time duration of about 10 percent of the time duration of each cycle.

References Cited in the file of this patent

UNITED STATES PATENTS 2,495,655    Girard _____ Jan. 24, 1950

FOREIGN PATENTS 732,230    Great Britain _____ June 22, 1955
732,403    Great Britain _____ June 22, 1955